(12) United States Patent
Kaneko (10) Patent No.: US 7,963,296 B2
(45) Date of Patent: *Jun. 21, 2011

(54) FUEL CUTOFF VALVE

(75) Inventor: Kenichiro Kaneko, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 605 days.

This patent is subject to a terminal disclaimer.

(21) Appl. No.: 11/642,945

(22) Filed: Dec. 21, 2006

(65) Prior Publication Data

US 2007/0144580 A1    Jun. 28, 2007

(30) Foreign Application Priority Data

Dec. 28, 2005 (JP) ................................. 2005-377646

(51) Int. Cl.
*F16K 24/04* (2006.01)
(52) U.S. Cl. ..................................................... 137/202
(58) Field of Classification Search .................... 137/43, 137/171, 197, 202, 587, 39, 199
See application file for complete search history.

(56) References Cited

U.S. PATENT DOCUMENTS

| 5,413,137 | A | * | 5/1995 | Gimby | 137/200 |
| 6,085,771 | A | * | 7/2000 | Benjey et al. | 137/15.26 |
| 6,758,235 | B2 | | 7/2004 | Frohwein et al. | |
| 7,784,484 | B2 | * | 8/2010 | Furuya | 137/202 |

FOREIGN PATENT DOCUMENTS

| JP | 63-150175 U | 10/1988 |
| JP | A-07-279789 | 10/1995 |

OTHER PUBLICATIONS

Notice of Rejection mailed on May 11, 2010 from the Japan Patent Office in counterpart Japanese application No. 2005-377646.

\* cited by examiner

*Primary Examiner* — Stephen M Hepperle
*Assistant Examiner* — Craig M Schneider
(74) *Attorney, Agent, or Firm* — Posz Law Group, PLC (57) ABSTRACT

The fuel cutoff valve comprises a float and a valve mechanism situated within the valve chamber of a casing. The float has a supporting portion disposed in the upper portion of the float for supporting the valve mechanism, and having a supporting face formed with a flat surface or concave surface. The valve mechanism comprises a comprises a first valve main body having a supported part of convex shape supported on the supporting face, and a seat portion disposed on the first valve main body for opening and closing a connecting passage. The center of gravity of the valve mechanism is established below the point of support, when the supported part is supported on the supporting face so as to be balanced with the supported lower end portion as the point of support.

9 Claims, 7 Drawing Sheets

FUEL CUTOFF VALVE

This application claims the benefit of and priority from Japanese Application No. 2005-377646 filed Dec. 28, 2005, the content of which is incorporated herein by reference.

BACKGROUND OF THE INVENTION

1. Field of the Invention

The present invention relates to a fuel cutoff valve installed on the upper portion of a fuel tank for the purpose of shutting off communication of the fuel tank with the outside by means of opening or closing of a connecting passage that connects the fuel tank interior with the outside.

2. Description of the Related Art

A fuel cutoff valve is disclosed in JP-A 7-279789. Specifically, the fuel cutoff valve is mounted on the upper portion of a fuel tank, and comprises a casing having in the upper portion thereof a connecting passage for connection to the outside (a canister), a float for increasing or decreasing buoyancy and rising or falling according to the fuel level within the valve chamber, and an upper portion valve body installed in the upper portion of the float. The fuel cutoff valve is configured such that the float increases in buoyancy due to a rise in fuel level in the fuel tank, and the upper portion valve body integral with the float rises, thereby closing off the connecting passage to halt the flow of fuel to the outside.

The upper portion valve body is a flat plate valve body, and is supported on the upper portion of the float by positioning the center portion thereof on a projection of conical shape projecting up from the upper portion of the float. By means of this design, in the event that the float should tilt due to leaning of the vehicle or other cause, the upper portion valve body will tilt on the conical projection and become seated in the seal portion of the connecting passage, i.e. the upper portion valve body maintains a horizontal attitude corresponding to the attitude of the float, to afford enhanced sealing.

However, the upper portion valve body is susceptible to being supported by the projection of the float in an attitude of displacement away from the center of the upper portion valve body. A resultant problem is that the attitude of the upper portion valve body is not stable, so that sealing ability declines due one-sided contact with the seal portion of the connecting passage. As one design for addressing this problem, there has been disclosed a fuel cutoff valve comprising a float and an upper portion valve body positions on the upper portion the float, with a recess in the upper portion valve body being supported oscillatably on a projecting portion of the upper portion of the float, so that the upper portion valve body is maintained in the horizontal attitude with respect to tilt of the float (U.S. Pat. No. 6,758,235). However, a problem with the fuel cutoff valve is that a projection of the upper portion valve body is point-bearing and has a conical shape in order to stabilize the attitude, and when the distal end thereof becomes worn with service for an extended period, there is a drop in the force restoring the upper portion valve body to the horizontal position.

SUMMARY

An advantage of some aspects of the invention is provided with a fuel cutoff valve affording high sealing ability even if the float should tilt, that forces the upper portion valve body to ascend and descend in stable attitude, and that maintains excellent sealing ability for an extended period.

According to an aspect of the invention is provided with a fuel cutoff valve that is to be mounted on an upper portion of a fuel tank, for opening and closing a connecting passage that connects between an inside of the fuel tank and outside. The fuel cutoff valve comprises: a casing that forms a valve chamber that connects the inside of the fuel tank and the connecting passage; and a float mechanism that is housed in the valve chamber and includes (i) a float that rises and falls according to a fuel level in the valve chamber and (ii) a valve mechanism that is disposed above an upper portion of the float and opens and closes the connecting passage through rising and falling of the float. The float has a supporting portion disposed on the upper portion of the float for supporting the valve mechanism, the supporting portion having a supporting face, and the valve mechanism includes (i) a valve body having a supported part of convex shape supported on the supporting face, and (ii) a seat portion disposed on the valve body for opening and closing the connecting passage, the valve mechanism being configured such that a center of gravity of the valve mechanism is set below a support portion where the supporting portion supports the supported part under a balance.

When fuel is supplied to a fuel tank employing the fuel cutoff valve pertaining to the invention and the fuel level in the fuel tank has reached a prescribed level, the float ascends through buoyancy by means of the fuel which has flowed into the valve chamber, and the upper portion valve body also ascends in unitary fashion with the float. The connecting passage becomes closed off by the ascending upper portion valve body, thereby cutting off the fuel tank from the outside and preventing fuel from flowing from the fuel tank to the outside. The upper portion valve body is supported at a single point of support by the supporting face of the support portion, and moreover the center of gravity of the upper portion valve body is situated at a location below the point of support, so that the upper portion valve body is balanced with the point of support as the center and has a stable attitude. Furthermore, the supporting face is a flat surface or concave shape while the supported portion is a curving convex portion, so that even if the convex portion becomes worn to a certain extent it will not lose its function of maintaining horizontal attitude. Thus, even if the float should tilt due to leaning of the vehicle, the upper portion valve body will maintain a stable horizontal attitude for an extended period, and will reliably contact and release from the seal portion of the connecting passage so that high sealing ability can be attained. Moreover, despite the fact that the supported portion constituted by the convex shape of the upper portion valve body is supported by the supporting face at a location different from the centerline of the float, the attitude of the upper portion valve body will be stable, since it is balanced with the supported portion as the point of support.

In a preferred embodiment of the upper portion valve body pertaining to the present invention, the valve mechanism includes a first valve unit and a second valve unit. The first valve unit has (i) a first valve main body with a support hole, (ii) a first seat part that is formed on the first valve main body and opens and closes the connecting passage, (iii) a connecting hole that is formed in the first valve main body and (iv) a connecting hole that is formed to pass through the first valve main body and connects the support hole with connecting passage, an area of the connecting hole being smaller than that of the connecting passage. The second valve unit has (i) a second valve main body that is interposed between the first valve unit and an upper portion of the float and that is housed within the support hole, (ii) a second seal portion that is disposed on the upper part of the second valve main body and opens and closes the connecting hole, and (iii) a supported part of convex shape that is formed on a lower part of the second valve main body and supported on the supporting face. The valve mechanism is configured such that a center of gravity of the valve mechanism is set below a support portion where the supporting portion supports the supported part under a balance. By means of this arrangement, when the upper portion valve body opens the connecting passage, the connecting hole, which has a smaller passage area than the connecting passage, opens prior to the second valve unit, the force applied to the first valve unit in the valve-closing direction is reduced, and the connecting passage opens rapidly, thus is affording excellent valve-reopening characteristics.

As another embodiment, there can be employed an arrangement wherein the first valve body comprises a side wall of round cylindrical shape, and the second valve body comprises a guide cylinder to be housed to rise and fall in the support hole. With this arrangement, there can be provided a guide portion for guiding the second valve body in a vertical direction, disposed between the guide cylinder of the second valve body and the side wall. By means of this arrangement, tilt of the first valve body and the valve body can be reduced, and sealing ability can be improved.

As yet another preferred embodiment of the present invention, there can be employed an arrangement wherein the upper portion of the first valve unit comprises a vent hole connecting the valve chamber and the support hole. By means of this arrangement, even if the pressure of the space inside the round cylindrical valve body should reach a high level, the pressure of the internal space will escape through the vent hole, thereby reducing the force drawing apart the second seat portion and the seal portion of the upper portion of the float, and preventing a decline in sealing ability.

These and other objects, features, aspects, and advantages of the present invention will become more apparent from the following detailed description of the preferred embodiments with the accompanying drawings.

DESCRIPTION OF THE PREFERRED EMBODIMENTS (1) Simple Arrangement of Fuel Cutoff Valve 10

Figure 1:
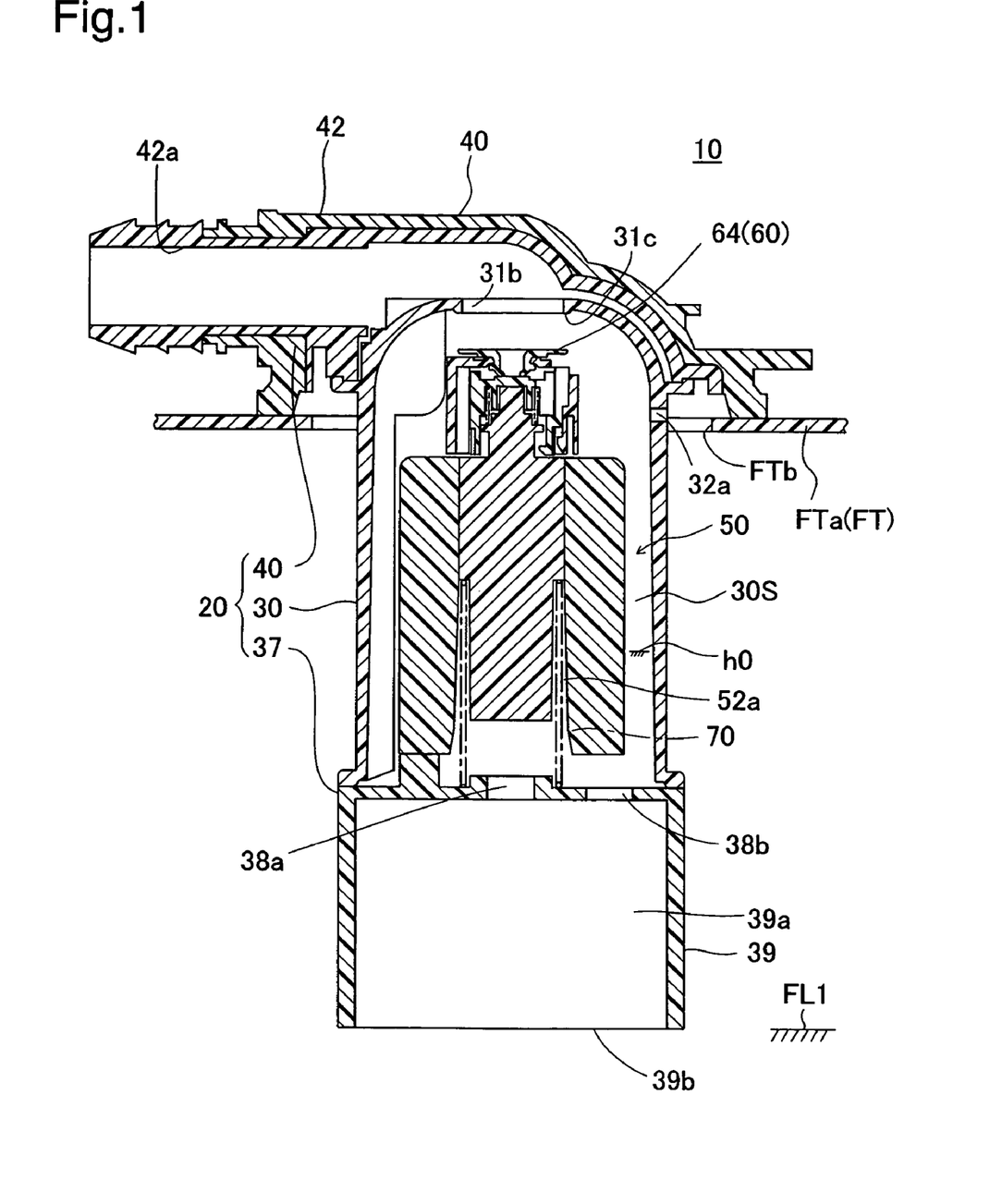
FIG. 1 is a sectional view depicting a fuel cutoff valve pertaining to an embodiment of the invention, attached to the upper portion of an automobile fuel tank.

FIG. 1 is a sectional view depicting a fuel cutoff valve 10 pertaining to an embodiment of the invention, shown attached to the upper portion of an automobile fuel tank FT. In FIG. 1, the fuel tank FT is formed from composite synthetic resin that includes polyethylene on its surface; a mounting hole FTb is formed in the tank upper wall FTa. The fuel cutoff valve 10 is attached with the lower portion thereof being inserted into the mounting hole FTb. The fuel cutoff valve 10 functions to restrict outflow from the canister once the fuel level within the tank has reached a prescribed level during fueling.

(2) Arrangement of Parts of Fuel Cutoff Valve 10

The fuel cutoff valve 10 comprises mainly a casing 20, a float mechanism 50, and a spring 70. The casing 20 comprises a casing body 30, a base member 37, and a cover 40. The space enclosed by the casing body 30 and the base member 37 constitutes a valve chamber 30S, and the float mechanism 50, supported on the spring 70, is housed in this valve chamber 30S.

Figure 2:
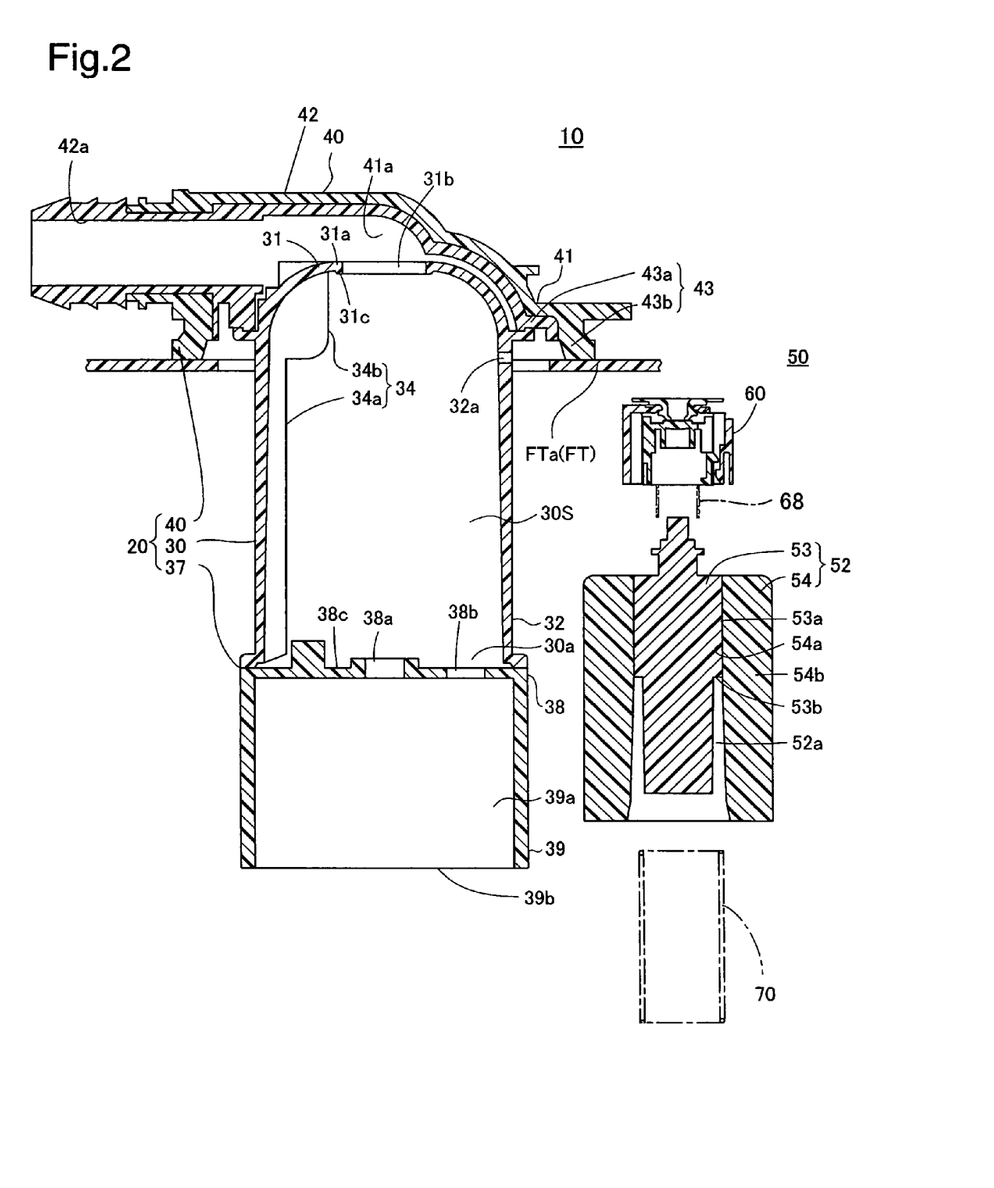
FIG. 2 is an exploded sectional view of the fuel cutoff valve.

FIG. 2 is an exploded sectional view of the fuel cutoff valve 10. The casing body 30 is of cup shape enclosed by a ceiling wall 31 and a side wall 32; its lower end forms an opening 30a. In the center of the ceiling wall 31 is formed a passage formation projection 31a that projects downward; a connecting passage 31b is formed perforating this passage formation projection 31a. The side of the valve chamber 30S constitutes a seal portion 31c. A first communication hole 32a connecting the fuel tank FT interior with the valve chamber 30S is formed in the side wall 32. A case guide portion 34 of rib configuration for guiding the float mechanism 50 is formed on the inside wall of the side wall 32 at each of four locations in the circumferential direction. The case guide portion 34 comprises a lower guide rib 34a formed in the lower portion of the casing body 30, and an upper guide rib 34b formed further towards the center axis from the lower guide rib 34a.

The base member 37 is a component that partially closes off the opening 30a of the casing body 30, and that functions to guide fuel vapor and liquid fuel into the valve chamber 30S. The base member 37, a base plate 38, and a cylindrical portion 39 are integrally formed, with the outside peripheral portion of the base plate 38 welded to the lower end of the casing body 30. On the base plate 38 are formed flow passage holes 38a, 38b, as well as a spring support portion 38c for supporting the lower end of the spring 70. The cylindrical portion 39 comprises a guide passage 39a; fuel vapor and liquid fuel from a guide opening 39b are guided into the valve chamber 30S through the fluid passage hole 38a.

The cover 40 comprises a cover body 41, a tube portion 42 projecting to the side from the center of the cover body 41, and a flange 43 formed on the outside periphery of the cover body 41; these elements are integrally formed. A cover passage 42a is formed in the tube portion 42; this cover passage 42a connects at a first end thereof to the valve chamber 30S of the casing body 30 via the connecting passage 31b, and at the other end to a canister (on the side omitted from the drawing). An inside weld edge 43a for welding the upper edge of the outside peripheral portion of the casing body 30 is formed on the lower portion of the cover body 41, and an outside weld portion welded to the tank upper wall FTa of the fuel tank FT is formed on the lower end portion of the flange 43.

The float mechanism 50 is a two-stage valve structure having improved valve reopening characteristics, and comprises a float 52 and a valve mechanism 60 positioned on the upper portion of the float 52. The float 52 comprises a first float body 53 and a second float body 54, these elements being integrally assembled. The first float body 53 comprises a first float main body 53a. The second float body 54 comprises a second float body 54b cylindrical in shape and having a housing hole 54a. The first float main body 53a is inserted fitting into this housing hole 54a and thereby integrated with the first float body 53. The shoulder on the outside peripheral portion of the first float main body 53a constitutes a spring support portion 53b for supporting the upper end of the spring 70. The spring 70 is disposed in a spring housing gap 52a (FIG. 10) which is a space between the first float body 53 and the second float body 54, with the spring 70 extending between the base member 37 and the spring support portion 38c.

Figure 3:
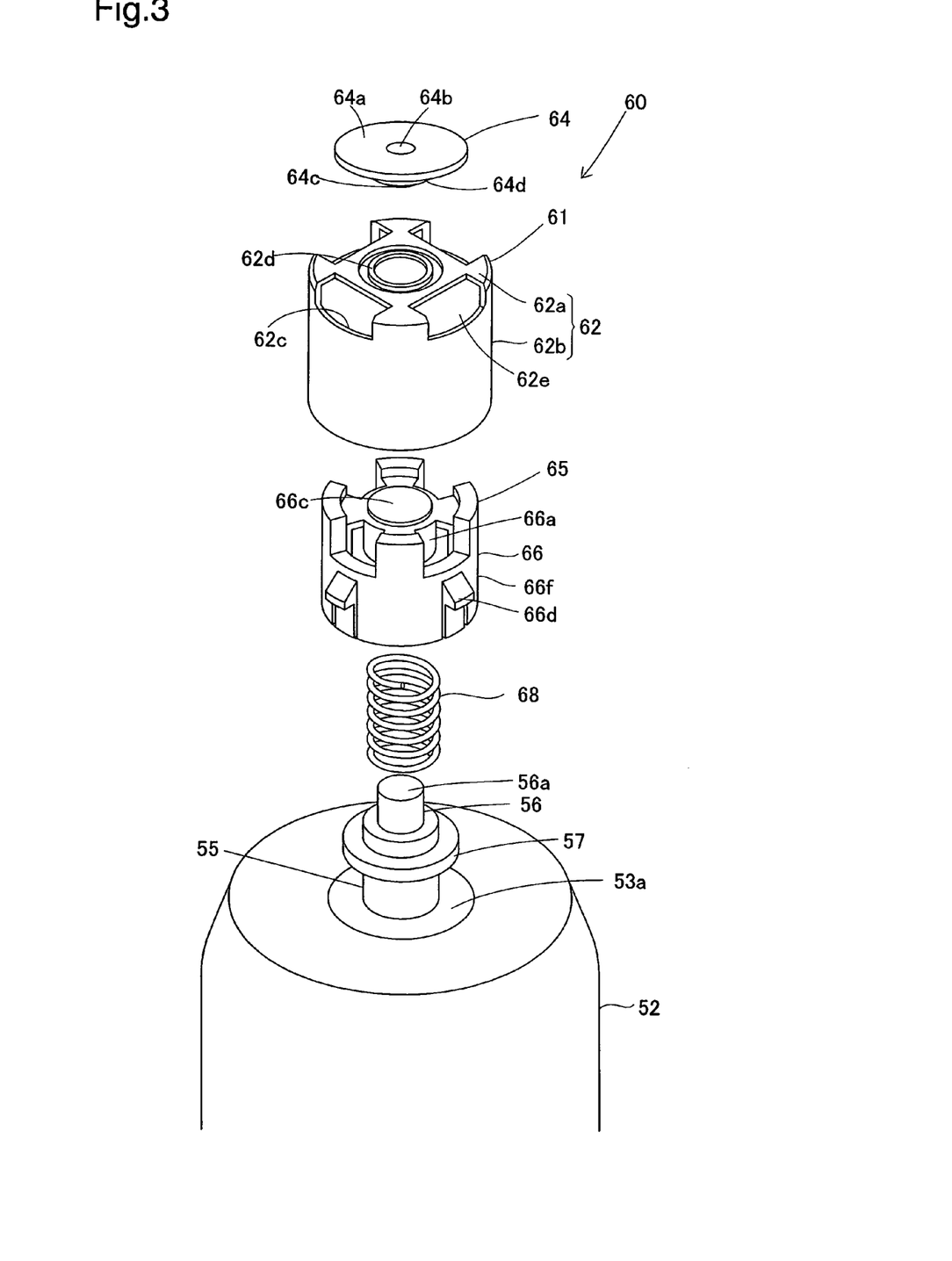
FIG. 3 is an exploded perspective view of the float and the first valve unit and second valve unit that make up the upper portion valve body.
Figure 4:
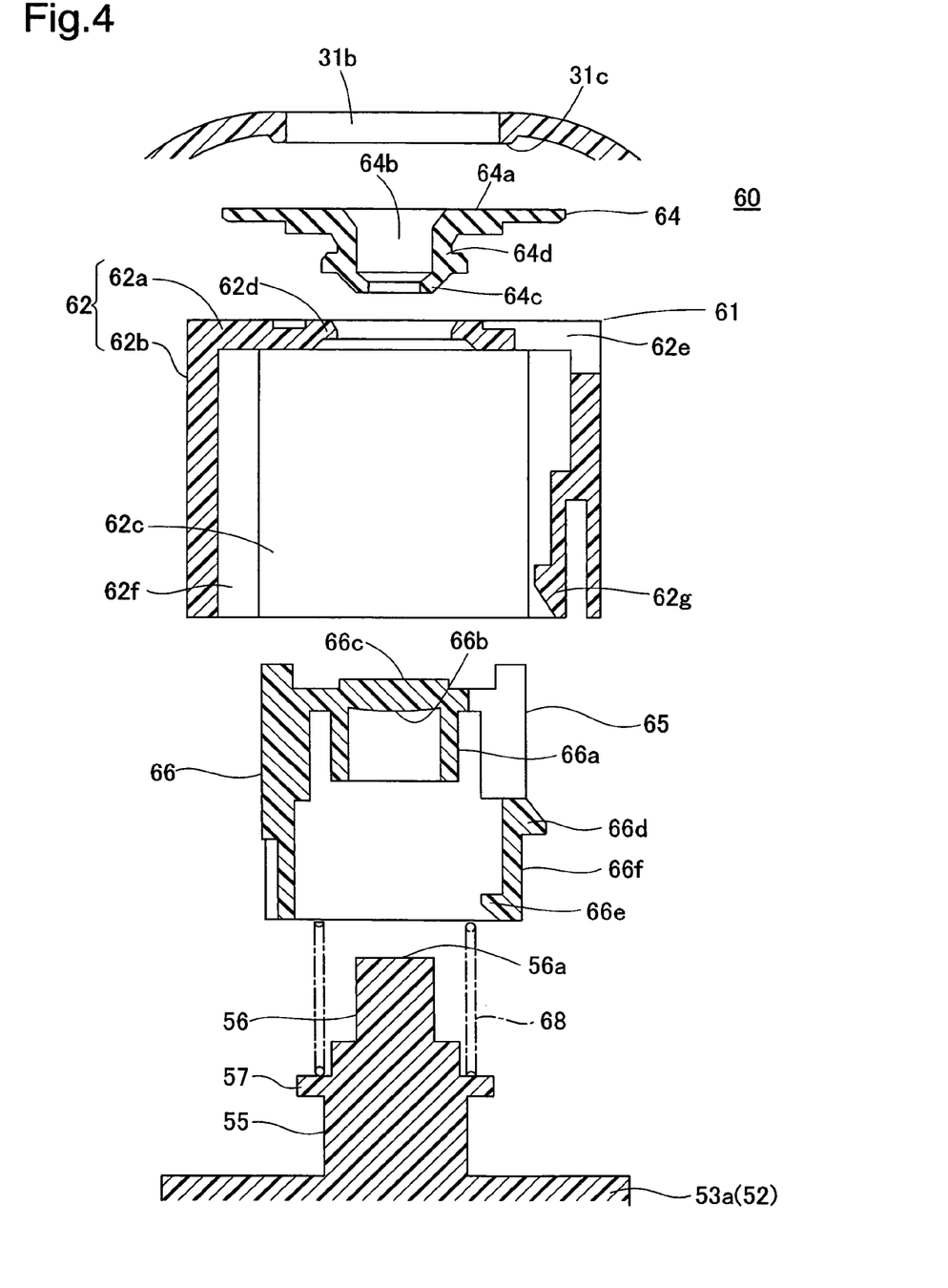
FIG. 4 is an exploded sectional view of the upper portion valve body.

FIG. 3 is an exploded perspective view of the float 52, and a first valve unit 61 and second valve unit 65 that make up the valve mechanism 60; FIG. 4 is a sectional view showing the vicinity of the valve mechanism 60. A valve supporting portion 55 projects from the upper portion of the first float body 53. The valve supporting portion 55 is a region that oscillatably supports the valve mechanism 60, and comprises a supporting projection 56 consisting of a projection of round post shape. The upper face of the supporting projection 56 constitutes a flat supporting face 56a. On the outside peripheral portion of the valve supporting portion 55 is formed an annular projection 57 for detaining the valve mechanism 60.

The valve mechanism 60 comprises a first valve unit 61 and a second valve unit 65, and is supported oscillatably to be able to rise and fall on the valve supporting portion 55 of the float 52. The first valve unit 61 comprises a first valve main body 62 of bottomed cylindrical shape, and a seat member 64 attached to the first valve main body 62. The first valve main body 62 comprises an upper face portion 62a and a side wall 62b of cylindrical shape projecting from the outside edge portion of the upper face portion 62a; the interior space thereof constitutes a support hole 62c. A mounting portion 62d for mounting the seat member 64 is formed in the center portion of the upper face portion 62a. Vent holes 62e for connecting the support hole 62c to the outside are formed at four locations on the outside edge portion at the top of the first valve main body 62. The inside peripheral wall of the side wall 62b shown in FIG. 4 has rib-shaped guide portions 62f projecting in the vertical direction at four locations equidistant around the circumference, for guiding the second valve unit 65 in a vertical direction. On the inside peripheral wall of the side wall 62b is formed an elastically deformable interlocking catches 62g for interlocking with the second valve unit 65.

The seat member 64 comprises a seat portion 64a that alternately contacts or releases from the seal portion 31c; a connecting hole 64b perforating the center of the seat portion 64a and connecting with the support hole 62c; a seat portion 64c formed at the lower end of the connecting hole 64b; and a mounting portion 64d formed to the outside periphery of the connecting hole 64b, these elements being integrally molded of rubber material. The seat member 64 is installed by means of the mounting portion 64d being pressure-fit into the mounting portion 62d of the first valve main body 62; the seat portion 64a, by being disposed across a gap from the upper face portion 62a of the first valve main body 62 is able to undergo elastic deformation when seated against the seal portion 31s to provide enhanced sealing ability.

The second valve unit 65 comprises a second valve main body 66 of cylindrical shape. On the second valve main body 66 is formed a guide portion 66a having the form of a bottomed cylinder open at the bottom. The guide portion 66a, by being slipped over the supporting projection 56 with a prescribed gap, prevents the second valve unit 65 from tilting to any appreciable degree relative to the float 52. In the center part of the upper face of the guide portion 66a there is formed a supported part 66b of convex shape bowing slightly downward. The supported part 66b rests on the supporting face 56a of the float 52, thereby making it possible for the second valve unit 65 to be supported oscillatably, with the supporting portion 55a as the point of support.

A second seal portion 66c is formed on the upper face of the second valve main body 66, this second seal portion 66c being formed so that as to contact and release from the seat portion 64c of the first valve unit 61 in order to open and close the connecting hole 64b. In the lower portion of the second valve main body 66 a detaining catch 66d is formed at each of four locations, and these interlock with the interlocking catches 62g of the first valve unit 61 to support the first valve unit 61 in a vertical direction on the second valve unit 65. Interlocking catches 66e are formed on the inside wall of the second valve main body 66, and interlocks with the annular projection 57 of the float 52, whereby the second valve unit 65 is supported to be capable of rising and falling and detained on the float 52.

The center of gravity of the valve mechanism 60 is established below the supported part 66b. As the arrangement for this purpose, the first valve unit 61 and the second valve main body 66 are each of cylindrical shape, extending below the supported part 66b supported on the supporting face 56a. A spring 68 is interposed between the annular projection 57 of the float 52 and the lower face of the valve mechanism 60, and the float is supported on the valve mechanism 60 via the spring 68.

Figure 5:
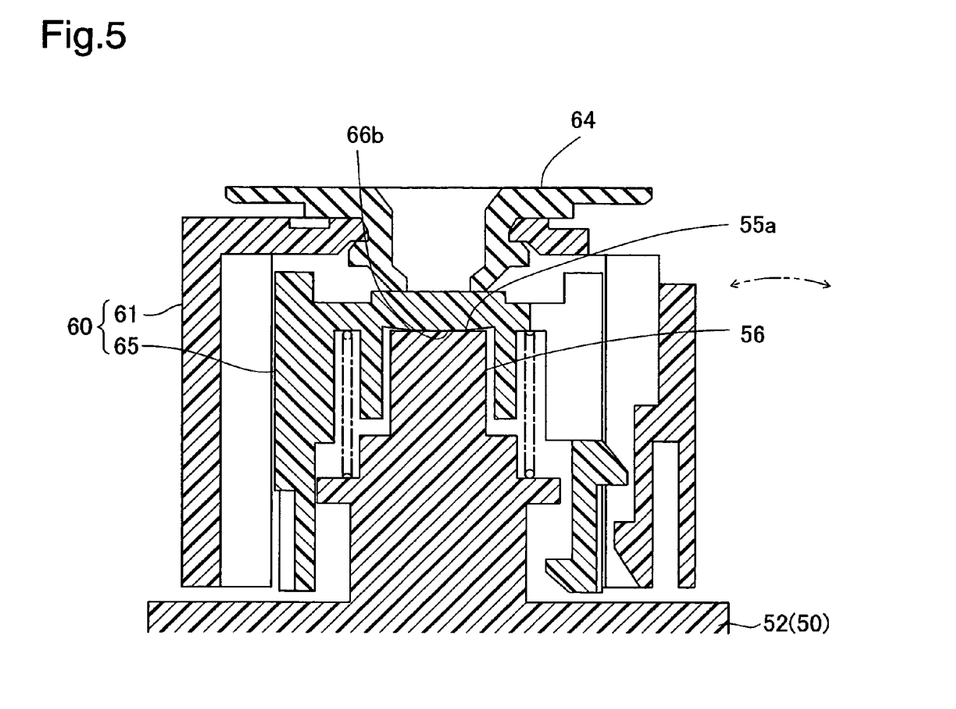
FIG. 5 shows the operation of the float mechanism.

FIG. 5 is an illustration depicting operation of the float mechanism 50. Let it be assumed that, as shown in FIG. 5, the float 52 has tilted in the direction of the arrows, due to leaning of the car for example. Since the supported part 66b of bowed convex shape is supported at a single point of support by means of the supporting portion 55a constituting the flat surface of the float 52, the second valve unit 65 is balanced like a balance toy, and the seat member 64 of the first valve unit 61 maintains a horizontal attitude.

(3) Operation of Fuel Cutoff Valve 10

Figure 6:
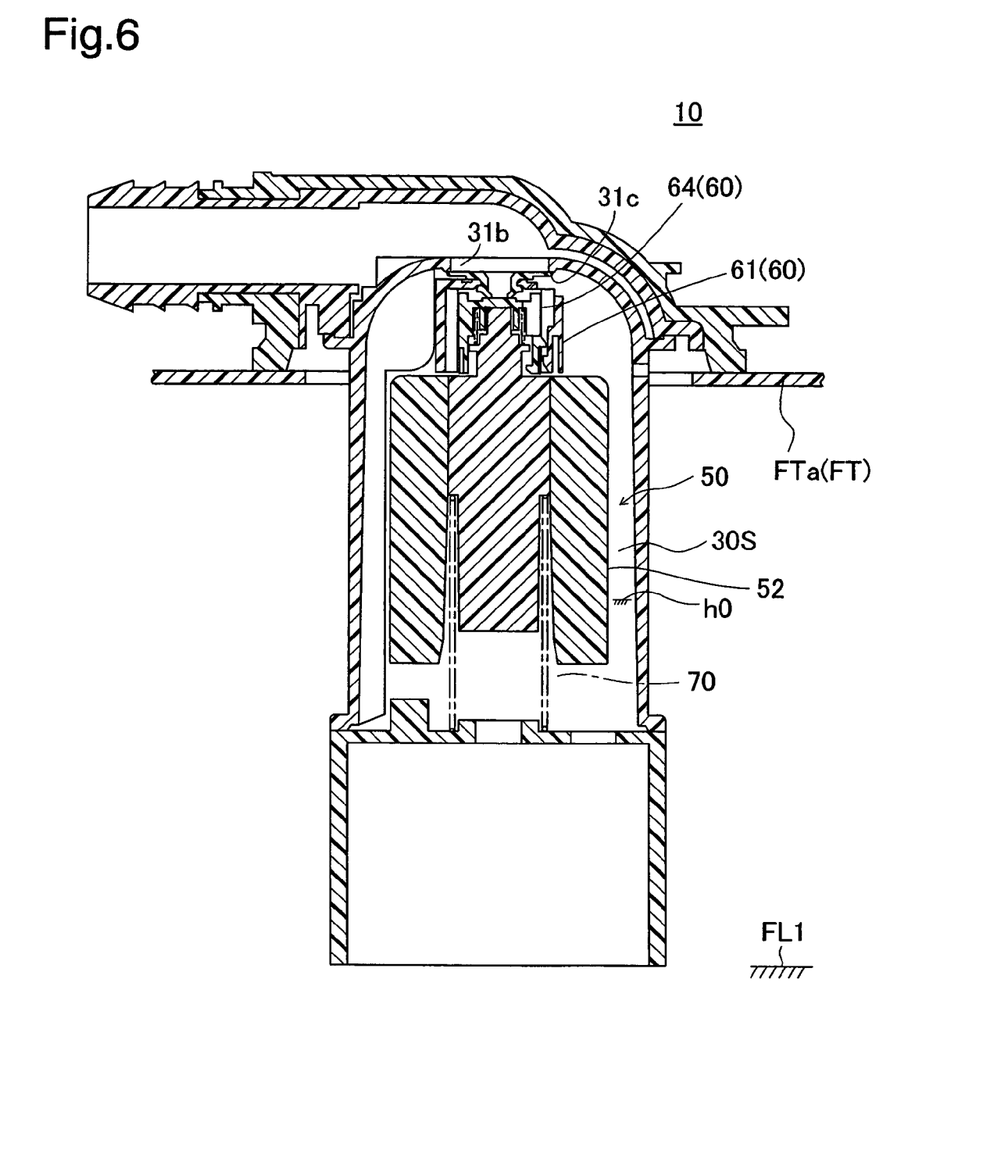
FIG. 6 shows the operation of the fuel cutoff valve.

Next, operation of the fuel cutoff valve 10 shall be discussed. As depicted in FIG. 1, when fuel is supplied to the fuel tank FT by fueling, as the level of fuel within the fuel tank FT rises the fuel vapors that have been trapped in the upper part of the fuel tank FT flow from the guide opening 39b of the cylindrical portion 39, through the guide passage 39a, and into the valve chamber 30S from the flow passage holes 38a, 38b. The fuel vapors then escape from the valve chamber 30S towards the canister side, via the connecting passage 31b and the cover passage 42a. When the fuel level within the fuel tank FT reaches a prescribed level FL1, the fuel now blocks the guide opening 39b whereby the tank internal pressure in the fuel tank FT begins to rise. In this state, an appreciable pressure differential arises between the tank internal pressure on the one hand and the pressure within the valve chamber 30S on the other, whereupon the liquid fuel flows into the valve chamber 30S through the guide passage 39a and the flow passage holes 38a, 38b so that the fuel level in the valve chamber 30S now rises. Then, as shown in FIG. 6, when the fuel level within the valve chamber 30S reaches a height hO, due to counterbalance between upward force produced by the buoyant force of the float 52 and the load of the spring 70, and downward force due to the weight of the float mechanism 50, the former overcomes the latter and the float mechanism 50 as a whole now ascends, whereby the seat member 64 of the valve mechanism 60 becomes seated in the seal portion 31c, closing off the connecting passage 31b. At this time, fuel collects in the inlet pipe, and when the fuel comes into contact with the fuel gun, fueling of the fuel gun stops automatically. By so doing, during fueling of the fuel tank FT it is possible to prevent fuel vapors from escaping from the fuel tank FT, as well as fuel from spilling out from the fuel tank FT.

Figure 7:
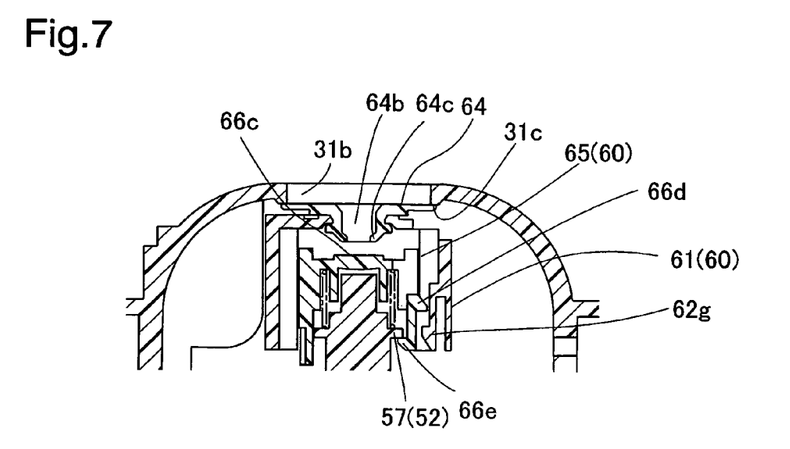
FIG. 7 shows the operation, continuing from FIG. 6.

Meanwhile, as the fuel in fuel tank FT is consumed and the fuel level drops, the float 52 decreases in buoyancy and descends. As shown in FIG. 7, due to the descent of the float 52, the float 52 will pull the second valve unit 65 downward due to the interlock of the annular projection 57 of the float 52 with the interlocking catches 66e of the second valve unit 65. The second seal portion 66c will released thereby from the seat portion 64c, and the connecting hole 64b will open. Due to this opening of the connecting hole 64b, the pressure below the first valve unit 61 will now equal the pressure in proximity of the connecting passage 31b. The second valve unit 65 will also pull down the first valve unit 61 due to interlocking of the detaining catches 66d and the interlocking catches 62g. As the first valve unit 61 descends, the seat member 64 will release from the seal portion 31c, opening up the connecting passage 31b. In this way, the two-stage valve structure produced by the first valve unit 61 and the second valve unit 65 functions to promote improve the valve reopening characteristics. At this time, since the seal portion 64c releases from the second seal portion 66c to initially connect with the connecting hole 64b having a constricted passage area, the pressure in the lower portion of the first valve unit 61 drops, and force in the closing direction of the first valve unit 61 is lower, whereby valve reopening characteristics are excellent.

(4) Effects and Advantages of the Embodiment

The design of the embodiment discussed above affords the following effects and advantages.

(4)-1 Once the fuel level in the fuel tank produced by fueling reaches the prescribed level FL1 at which the guide opening 39b becomes blocked, the tank internal pressure within the fuel tank FT will rise, causing the auto stop function to operate.

(4)-2 Since the valve mechanism 60 is supported at the supported part 66b at a single point of support by means of the supporting face 56a of the supporting portion 55a provided on the upper part of the float 52, and moreover the center of gravity of the valve mechanism 60 is at a location below the point of support, the valve mechanism 60 will be balanced about the point of support and will have a stable attitude. Furthermore, since the supporting face 56a is a flat surface while the supported portion is a convex portion, even if the convex portion should experience a certain amount of wear, the function of maintaining a horizontal attitude will not suffer. Consequently, even if the float 52 should tilt due to leaning of the automobile, the valve mechanism 60 can be maintained in a stable horizontal attitude for an extended period, affording reliable contact with and release from the seal portion 31c of the connecting passage 31b, and high sealing ability.

(4)-3 Since the valve mechanism 60 per se operates in such a way as to stabilize attitude on the same basic principle as a balance toy, the force pressing on the seal portion 31c will be low, and the lifting force required of the float 52 in to open the valve will be low as well, so it is possible to respond to slight rises in fuel level produced during leaning of the automobile for example. Moreover, despite the fact that the supported part 66b constituted by the convex shape of the valve mechanism 60 is supported by the supporting face 56a at a location different from the centerline of the float 52, the attitude of the valve mechanism 60 will be stable since it is balanced with the supported part 66b as the point of support.

(4)-4 In association with the rising level of fuel within the fuel tank during fueling, fuel vapors that have collected in the upper space of the fuel tank FT form a rising current within the valve chamber 30S and enter into the support hole 62c of the first valve unit 61, but then pass through the gap between the support hole 62c and the guide cylinder 66f to escape from the vent hole 62e. For this reason, the rising current flowing through the support hole 62c does not collect in the upper portion of the support hole 62c, but instead escapes through the vent hole 62e. Consequently, there is no localized rise in pressure within the support hole 62c that would cause force pulling the second valve unit 65 apart from the first valve unit 61 to be exerted. Moreover, the guide portion 62f of the first valve unit 61 is formed on the inside wall of the support hole 62c, and the second valve unit 65 is guided with respect to the first valve unit 61, without tilting. Consequently, the second valve unit 65 will not experience tilting during its ascent, and the second seal portion 66c will become seated in the seat portion 64c with a high degree of sealing ability, thus avoiding the problems associated with loss of sealing ability between these parts, specifically, problems such as fuel flowing to the outside through the connecting hole 64b and the connecting passage 31b.

(4)-5 The spring 68 interposed between the valve mechanism 60 and the float 52 applies force in the opening direction of the valve mechanism 60 even with the valve mechanism 60 in the submersed state, so that even if the fuel cutoff valve 10 should be subjected to slight vibration caused by vibration of the vehicle for example, the seat portion 64a of the valve mechanism 60 will not readily release from the seal portion 31c, and the vibration will not act to the extent that opening of the valve mechanism 60 occurs.

(5) Other Embodiments

The invention is not limited to the embodiment discussed above, and may be reduced to practice in various other forms without departing from the spirit thereof, such as the following modifications, for example.

Figure 8:
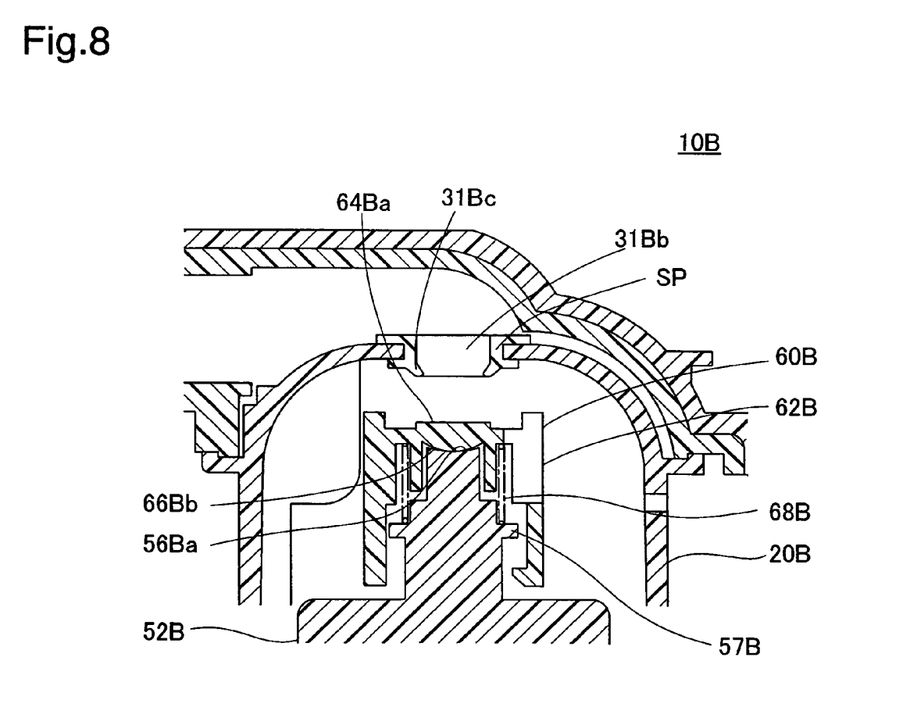
FIG. 8 is a sectional view depicting a fuel cutoff valve pertaining to another embodiment.

(5)-1 FIG. 8 is a sectional view depicting a fuel cutoff valve 10B pertaining to another embodiment. The fuel cutoff valve 10B pertaining to this embodiment features a modified design for the seal portion 31Bc and the valve mechanism 60B. Specifically, a seal member SP made of rubber is installed facing the connecting passage 31Bb of the casing 20B, and a seal portion 31Bc is disposed in the lower portion of this seal member. The valve mechanism 60B comprises a seat portion 64Ba disposed on the first valve main body 62B, for opening and closing the connecting passage 31Bb, and a first valve main body 62B having a supported part 66Bb of bowed convex shape; these are integrally formed of a single resin member. The supporting face 56Ba of the float 52B is formed with a concave face having a larger radius of curvature than the supported portion 64Bb. This design acts in such a way that, when the supported part 66Bb of the valve mechanism 60B is supported on the supporting face 56Ba of the float 52B, the valve mechanism 60B is balanced with the supported upper end thereof as the point of support. Moreover, since the supporting face 56Ba is a concave shape, the convex supported part 66Bb slides towards the center of the supporting face 56Ba, providing a centering action. Additionally, a spring 68B is interposed between the annular projection 57B of the float 52B and the lower face of the valve mechanism 60, with the float 52B supporting the valve mechanism 60b. By means of this spring 68B, force is applied in the opening direction of the valve mechanism 60B even with the valve mechanism 60B in the submersed state, so that even if the fuel cutoff valve 10B should be subjected to slight vibration caused by vibration of the vehicle for example, the seat portion 64Ba of the valve mechanism 60B will not readily release from the seal portion 31Bc, and the vibration will not act to the extent that opening of the valve mechanism 60B occurs.

(5)-2 While the preceding embodiment described an arrangement in which the fuel cutoff valve is installed on the upper face of the upper wall of the tank, the invention is not limited thereto, it being possible to employ a so-called in-tank arrangement whereby the fuel cutoff valve is installed on the inside face of the upper wall of the tank.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel cutoff valve that is to be mounted on an upper portion of a fuel tank, for opening and closing a connecting passage that connects between an inside of the fuel tank and outside, the fuel cutoff valve comprising:
    a casing that forms a valve chamber that connects the inside of the fuel tank and the connecting passage; and
    a float mechanism that is housed in the valve chamber and includes (i) a float that rises and falls according to a fuel level in the valve chamber and (ii) a valve mechanism that is disposed above an upper portion of the float and opens and closes the connecting passage through rising and falling of the float,
    wherein the float has a supporting portion disposed on the upper portion of the float for supporting the valve mechanism, the supporting portion having a supporting face, and
    the valve mechanism includes a first valve unit and a second valve unit, wherein
    the first valve unit has (i) a first valve main body with a support hole, (ii) a first seat part that is formed on the first valve main body and opens and closes the connecting passage, and (iii) a connecting hole that is formed to pass through the first valve main body and connects the support hole with connecting passage, an area of the connecting hole being smaller than that of the connecting passage; and
    the second valve unit has (i) a second valve main body that is interposed between the first valve unit and an upper portion of the float and that is housed within the support hole, (ii) a second seal portion that is disposed on the upper part of the second valve main body and opens and closes the connecting hole, and (iii) a supported part of convex shape that is formed on a lower part of the second valve main body wherein the supported part is configured to be supported at a single point on the supporting face, wherein the single point contacts the supporting face when the float is in an opening and closing position, and when the float falls from the closing position towards the opening position and the second seal portion opens the connection hole,
    wherein the valve mechanism is configured such that a center of gravity of the valve mechanism is set below a support portion, at which the supporting portion supports the supported part under a balance.

2. The fuel cutoff valve in accordance with claim 1, wherein the supporting face is flat.

3. The fuel cutoff valve in accordance with claim 1, wherein the supporting face is concave.

4. The fuel cutoff valve in accordance with claim 1, wherein the first valve main body includes a cylindrical side wall, and the second valve main body includes a guide cylinder that is housed to be able to rise and fall in a space of the side wall.

5. The fuel cutoff valve in accordance with claim 4, wherein the valve mechanism includes a guide portion that is disposed between the side wall of the first valve main body and the guide cylinder of the second valve main body, the guide portion being configured to guide the second valve main body in a vertically movable manner.

6. The fuel cutoff valve in accordance with claim 1, wherein the first valve unit includes a vent hole that connects the valve chamber with the support hole at an upper portion of the first valve main body.

7. The fuel cutoff valve in accordance with claim 1, wherein
    the float includes an annular projection formed on an upper portion of the float, and
    the second valve unit includes an interlocking catch that engages with the annular projection, engagement of the annular projection and the interlocking catch being configured to restrict vertical movement of the second valve unit.

8. The fuel cutoff valve in accordance with claim 1, wherein
    the first valve main body includes an interlocking catch formed on a side wall of the first valve main body, and
    the second valve main body includes a detaining catch that engages with the interlocking catch, engagement of the interlocking catch and detaining catch being configured to restrict vertical movement of the first valve main body.

9. The fuel cutoff valve in accordance with claim 1, wherein the seat portion is formed on a rubber valve attached to the first valve main body.

* * * * *